Feb. 16, 1943. K. M. URQUHART 2,311,009
DOUBLE SEATED VALVE
Filed April 18, 1938 2 Sheets-Sheet 1

INVENTOR
KENNETH M. URQUHART
BY
ATTORNEY

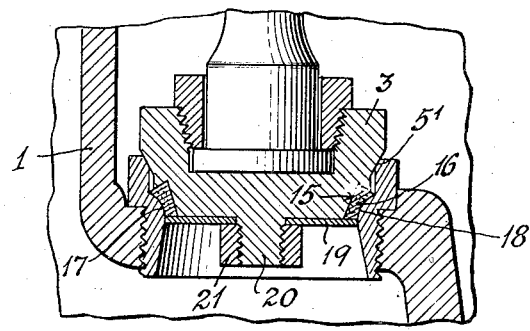

Patented Feb. 16, 1943

2,311,009

UNITED STATES PATENT OFFICE 2,311,009

DOUBLE SEATED VALVE

Kenneth M. Urquhart, New York, N. Y.

Application April 18, 1938, Serial No. 202,612

2 Claims. (Cl. 251—27)

My invention relates to a multiple seal valve adapted for handling corrosive hydrocarbons and other fluids.

The present application is in part a continuation of my co-pending application, Serial Number 36,573 filed August 16, 1935, now Patent No. 2,144,789, granted April 19, 1938.

Heretofore it has been the practice to employ single seated valves in which the packing ring was embedded or made a part of the valve disc or valve seat. These valves have proved unsatisfactory in that a certain amount of leakage occurred when the valve disc or seat became corroded or otherwise worn.

The principal object of my invention is to provide a double seated valve wherein the metal valve plug is adapted to seat against the metal valve seat, and a resilient packing ring located in the valve plug, is adapted to seat against the surface of the valve seat, thereby producing a double sealing effect.

Another object is to provide a metal sealing valve having an auxiliary sealing means, whereby the valve may be shut off tightly even when the metal surface becomes corroded or pitted.

Another object is to provide a valve having a readily replaceable packing member therein, which packing member overcomes the heretofore necessary expedient of replacing expensive alloy seats and plugs upon slight corrosion or pitting thereof.

A further object is to provide packing means in a valve whereby loss occasioned by leakage and fire is reduced to a minimum.

A further object is to provide a comparatively inexpensive and easily assembled valve structure.

These and other objects will be apparent when the specification is considered with the accompanying drawings, in which:

Fig. 7 is a vertical sectional view of a further modified form of the packing ring and its retaining ring;

Fig. 8 is a sectional view of the packing ring shown in Fig. 7.

Figure 1:
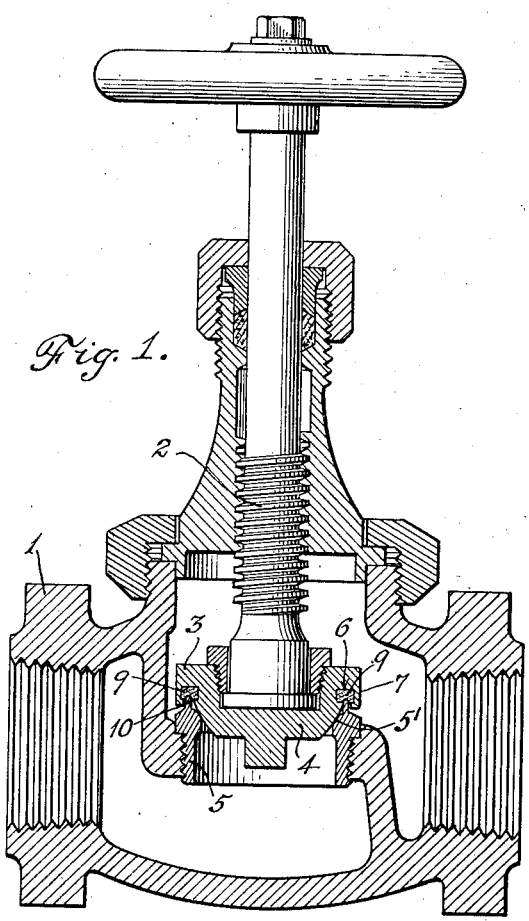
Figure 1 is a vertical sectional view of a valve embodying my invention.
Figure 2:
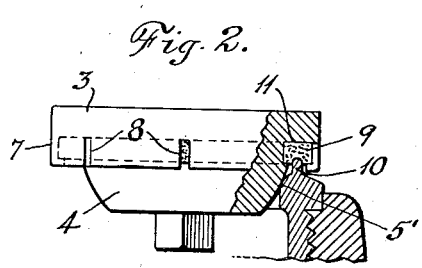
Fig. 2 is an enlarged side elevation of the valve plug partly in section, showing the resilient packing retaining means.
Figure 3:
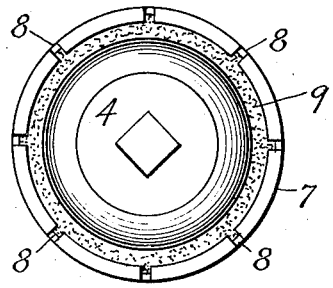
Fig. 3 is a plan view of the valve plug with the packing ring in position therein.
Figure 4:
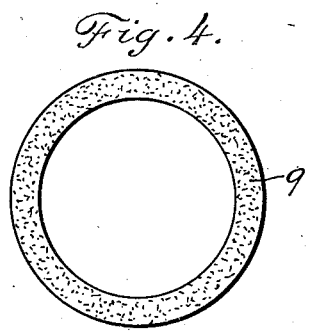
Fig. 4 is a plan view of the packing ring.

Referring more particularly to Figs. 1 to 4 of the drawings, in which similar reference characters refer to like parts throughout the several views, numeral 1 denotes the body of a globe valve, or the like, having a threaded valve stem 2 inserted therethrough. A conical metal head 4 of a valve disc or plug 3, is adapted to seat upon a correspondingly conically shaped valve seat member 5, having a valve seat portion. A substantially rectangular shaped annular groove 6 is formed in the valve disc 3, adjacent the outside wall 7 thereof, the wall 7 being slotted, as at 8, to render it slightly flexible. The groove 6 is adapted to receive a resilient packing ring 9, of rubber or the like, therein. The plug 3, being slotted, thus constitutes a flexible retaining means for the resilient packing ring. When handling light hydrocarbons, I prefer to form my resilient packing ring of artificial rubber compounds or the like. The upper end of the seat member 5 is reduced thereby forming a substantially upstanding ridge or valve ring 10, which is adapted to extend into the groove 6 and seat against the resilient packing ring 9. The groove 6 is preferably undercut in the valve plug, as at 11, which undercut edges serve to position the packing ring therein.

It will be noted that the conical metal valve head 4 will frictionally engage the metal valve seat portion $5^1$ and form a tight seal for the valve. Packing ring 9, having the valve ring 10 pressed thereagainst serves to form a tight seal and prevents valve leakage when the valve plug or seat becomes pitted, corroded, or otherwise damaged.

When the valve is in closed position, valve ring 10 will press against and spread the resilient packing ring 9, whereby the slotted retaining wall 7 of the groove will flex and allow for the spread of the packing ring, the relatively thin outer wall area opposite the groove or slot 8 being sufficiently resilient for this purpose. Therefore, when leakage between metal valve head and metal seat occurs, the tight engagement of valve ring 10 with packing ring 9 forms a tight seal for the valve and prevents any leakage therefrom.

Figure 5:
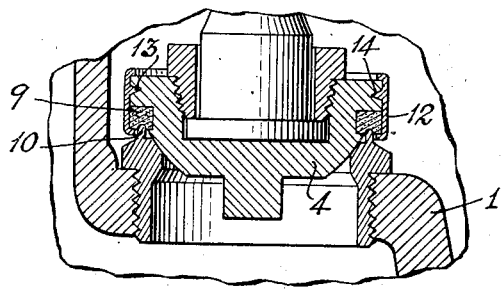
Fig. 5 is a vertical sectional view of a modified form of the packing ring retaining means.
Figure 6:
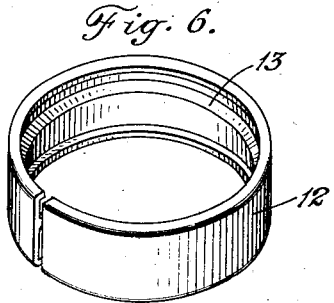
Fig. 6 is a detached perspective view of the packing ring retaining means, shown in Fig. 5 of the drawings.

A modification of my invention is disclosed in Figs. 5 and 6, wherein a removable resilient split retaining ring 12 is adapted to fit over the valve plug 4, a wedge-shaped tongue 13, or the like, being received in a substantially V-shaped groove 14 in the plug 4 serves to retain the ring in position on the plug. The resilient split ring 12 is adapted to flex when packing ring 9 is expanded thereagainst upon engagement of the valve ring 10 when the valve is in closed position and thus to constitute a flexible retaining means for the packing ring.

A further modification of my invention is disclosed in Figs. 7 and 8, wherein the side wall of valve disc or plug 3 is provided with an annular groove or recess 15, at the lower end thereof, which groove is adapted to receive a resilient packing band or ring 16 therein.

The valve seat portion 5 is provided with a rounded inner face 17, below the conical metal seat portion 5¹, for engaging a slightly curved or rounded outer face 18 of the packing ring, when the valve is closed. A thin metal disc 19 is adapted to be received on a relatively short threaded stem 20 of the valve, a lock nut 21, threadedly engaging the stem 20, serves to retain the disc in position against the lower end of the valve plug, thereby clamping the packing ring firmly in the groove 15.

It will be noted that when the valve is in closed position, the resilient packing ring will be forced against the rounded inner face 17 of the valve seat, thereby serving as an absolute sealing shut-off for the valve. Should a slight spacing occur between the metal valve plug and metal seat 5¹, due to corrosion or wear, the resilient packing ring, located at a point below the metal seating, will spread or expand against the rounded face 17 and prevent leakage. This last modification is particularly adapted for use with gritting liquids or to serve where the valve is operated in partly closed or throttled position.

While I have described specific embodiments in my invention and its particular application to existing types of valves, with the modifications therein necessary, it will be obvious to those skilled in the art, that various changes therein, particularly in the arrangement and configuration of the several parts thereof, may be made without departing from my invention.

I claim:

1. The combination in a valve structure of a metal seat for the valve, a packing member, means for engaging said seat with the packing member, means for applying pressure to the packing member for distorting the same against the valve seat, means for limiting said distortion of said packing member and means for applying pressure to restore the packing member substantially to its original shape when the valve is opened.

2. The combination in a valve structure of two metal seat members, a packing member, means for engaging one of said seat members with the packing member, means for applying pressure to the packing member, whereby it is distorted to conform to the irregular contour of the seat member, means for engaging the second seat member with a metallic valve plug, whereby the distortion of the packing member is limited, and means for applying pressure to the packing member to restore the same to its original shape when the valve is opened whereby permanent distortion of said packing member is avoided.

KENNETH M. URQUHART.